United States Patent [19]

Aucktor

[11] 4,094,517
[45] June 13, 1978

[54] SEAL FOR A UNIVERSAL JOINT

[75] Inventor: Erich Aucktor, Offenbach am Main, Germany

[73] Assignee: Lohr & Bromkamp GmbH, Offenbach am Main, Germany

[21] Appl. No.: 751,166

[22] Filed: Dec. 16, 1976

[30] Foreign Application Priority Data

Dec. 17, 1975 Germany ............................ 2556769

[51] Int. Cl.² .............................................. F16J 15/34
[52] U.S. Cl. ..................................................... 277/94
[58] Field of Search .............................. 277/82, 94, 95

[56] References Cited

U.S. PATENT DOCUMENTS 3,592,022   7/1971   Stokely ................................. 277/94
3,810,636   5/1974   Gorski ................................... 277/94

Primary Examiner—Robert I. Smith
Attorney, Agent, or Firm—Edmund M. Jaskiewicz

[57] ABSTRACT

In a universal joint there is provided a sealing ring for sealing relative to a trunnion and a bearing element surrounding a trunnion pin having roller bearings adjacent thereto. The sealing ring has an axial portion projecting between the bearing element and the trunnion pin toward the roller bearings. A chamber is formed between the sealing ring and the bearing element. A sealing lip on the axial portion engages the inner wall of the bearing element and defines an angle of less than 90°. The sealing lip is thin and resilient to define an annular membrane.

4 Claims, 6 Drawing Figures

SEAL FOR A UNIVERSAL JOINT

The present invention relates to a seal for a universal joint, more particularly, to a seal for a bearing element surrounding a trunnion pin having roller bearings adjacent thereto.

In a universal joint, a seal is generally provided with respect to the trunnion and a cylindrical bearing element surrounding the trunnion pin which is provided with a plurality of rolling or sliding bearing elements. Such a seal is generally resilient and extends into the interior of the bearing element. At least one chamber is provided on the side of the seal directed toward the annular end face of the bearing element. A sealing lip on the seal engages the inner wall of the bearing element and this sealing lip extends at an angle with respect to the inner wall of the bearing element of less than 90° when measured from the interior of the bearing.

It has been proposed to press fit such sealing rings into the end of the cylindrical bearing element or bushing. In order to assist and facilitate the press fitting operation there is provided a rounded shoulder directed toward the bushing or bearing element and there is also provided a supporting ring member which is suitably adherred to the sealing ring so as to preserve the shape of the ring. The sealing ring thus fits rigidly within the bearing element or bushing and moves with respect to the trunnion pin. This seal has the disadvantage that while it is possible to subsequently lubricate the universal joint by passing lubricant over the sealing lip, it is not possible to deliver a lubricant to the sealing lips which engage with the trunnion pins. As a result, once these lips run dry they will not receive any further supply of lubricant.

Other known forms of sealing rings have the disadvantage that it is always difficult and many times virtually impossible for any excess lubricant which may be applied to the trunnion to escape to the outside of the universal joint. As the lubricant presses against the sealing lip from the interior of the bearing element the lip will engage more closely with the knurled edge of the bearing element to thus close any possible passage for excess lubricant from the interior of the bearing element to the exterior thereof. As a result, lubrication for some or all of the trunnion pins tends to be non uniform and sometimes is completely absent. The unreliability of this lubrication thus presents the danger of individual bearing destruction and a resulting failure of the entire universal joint.

Another form of such a sealing ring is provided with a corrosion resistant sheet metal ring immediately preceding the sealing ring. However, this sealing arrangement has the disadvantage in that high manufacturing costs are involved and presents an additional structure in the limited space available of the universal joint. As a result, the trunnion pin used with such sealing arrangements must be smaller and thus have a correspondingly reduced strength.

It is therefore the principal object of the present invention to provide in a universal joint an improved seal for the bearing element surrounding a trunnion pin.

It is another object of the present invention to provide such a seal which is simple in structure and safe and reliable in operation and function.

It is a further object of the present invention to provide such a seal which insures proper lubrication for the trunnion pins for a long period of time after the initial lubrication and also provides for subsequent lubrication during the service life of the joint.

According to one aspect of the present invention a device for sealing relative to a trunnion of a universal joint and a bearing element surrounding a trunnion pin having roller bearings adjacent thereto may comprise a resilient sealing ring rigidly mounted on a trunnion pin and having a portion extending axially between the bearing element and trunnion pin toward the roller bearings. The face of the sealing ring directed toward the bearing element defines a chamber therewith. The axial portion is provided with a sealing lip which engages the inner wall of the bearing element and the lip defines an angle with the bearing element inner wall of less than 90° with respect to the interior of the bearing.

The sealing lip is so constructed so as to define an annular membrane.

The sealing ring disclosed herein has the advantage that since the seal does not move upon the trunnion pin no lubrication is required at this shoulder of the trunnion pin and no wear is likely to occur on this surface. The sealing lip functions as a check valve which allows the passage of excess lubricant in one direction only which is outwardly from the interior of the bearing element. As a result, no dirt is able to penetrate to the interior of the bearing element from the exterior thereof.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
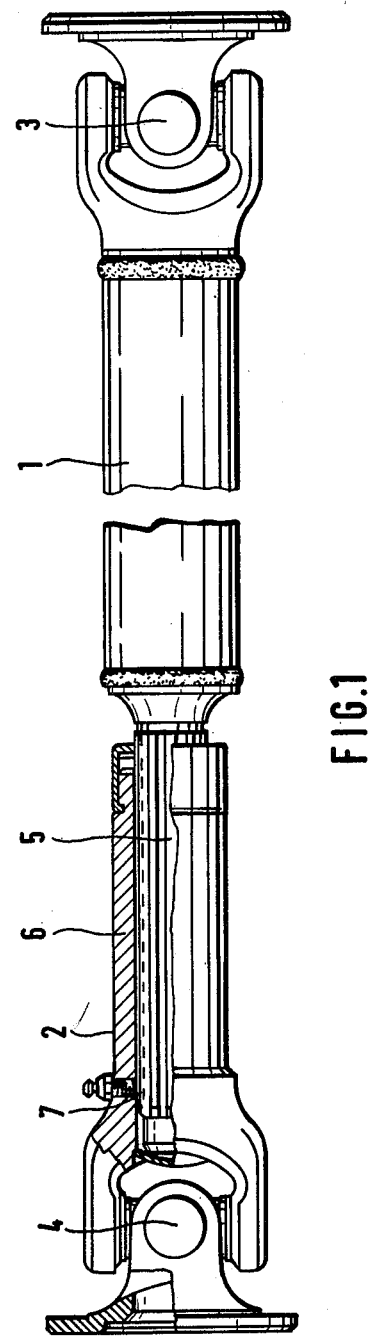
FIG. 1 is an elevational view of a cardan shaft having universal joints at both ends thereof with a portion of the shaft being shown in section.

In FIG. 1 there is illustrated a cardan shaft comprising co-axial shaft portions 1 and 2 the outer ends of which are provided with universal joints 3 and 4. The inner end of shaft portion 1 indicated at 5 is solid and is provided with longitudinal splines 7 for slidably engaging the correspondingly shaped splines in the tubular hollow end portion 6 of the shaft portion 2. The shaft portions are thus nonrotatably connected so as to transmit torque but are axially slidable with respect to each other.

Figure 2:
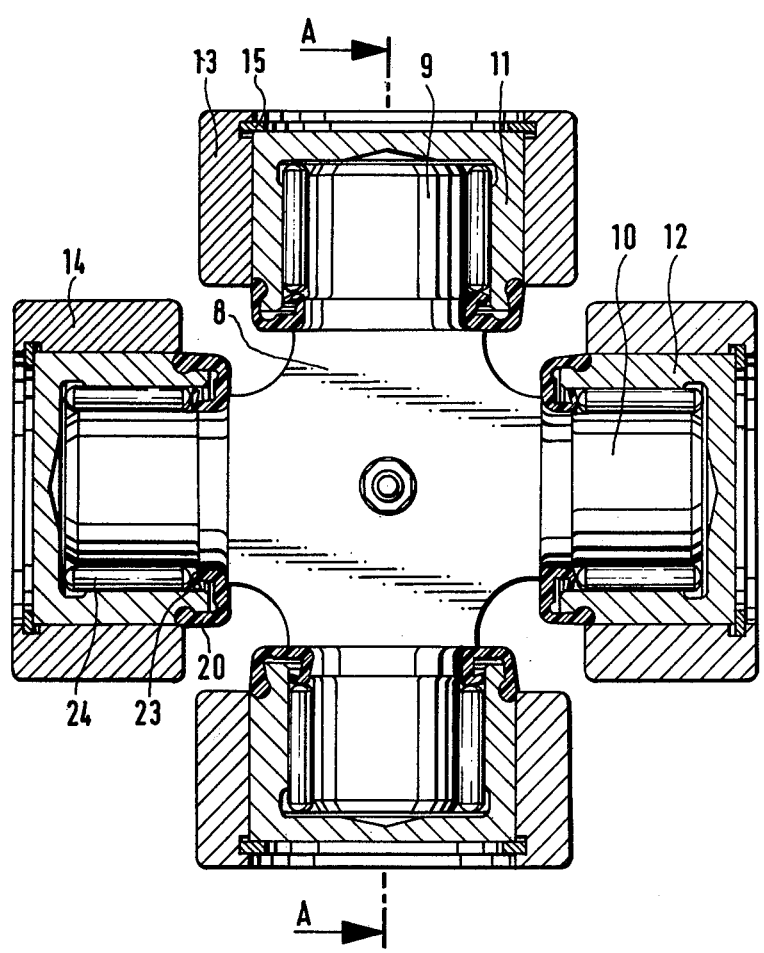
FIG. 2 is a planned view of a universal joint viewed in the axial direction of the shaft with the outer portions of the joint being shown in section in the plane of the trunnion pin.
Figure 3:
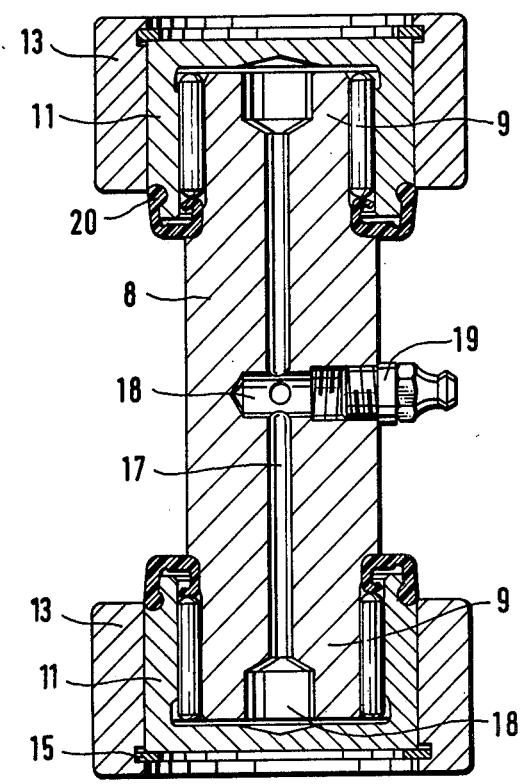
FIG. 3 is a sectional view taken along the line A—A of FIG. 2.

One of the universal joints 3, 4 is shown in FIGS. 2 and 3 and comprises a trunnion body 8 having four trunnion pins 9, 10 surrounded by cylindrical bearing elements or bushings 11, 12. The trunnion pins 9, 10 are each surrounded by a plurality of cylindrical roller bearings 24. Yoke arms of the universal joint are indicated at 13 and 14 and receive the bearing elements 11 and 12 as may be seen in FIG. 2. The bearing elements 11, 12 are retained in the bores of the yoke arms 13, 14 by means of split resilient rings 15 or the like seated in annular grooves formed in the bores of the yoke arms and bearing against the outer or closed ends of the bearing elements.

Bores 17 extend through the trunnion pins 9, 10 to intersect at the center of the trunnion body 8 to define a chamber 18 which functions as a lubricant reservoir and is closed by a lubricating fitting 19.

A sealing ring 20 is provided at the end of each of the bearing elements 11 and 12. The sealing ring is constructed to permit any excess lubricant applied during a subsequent lubrication of the joint to the exterior past the ring but no dirt, water or any other foreign bodies can penetrate into the interior of the bearing from the exterior thereof.

Figure 4:
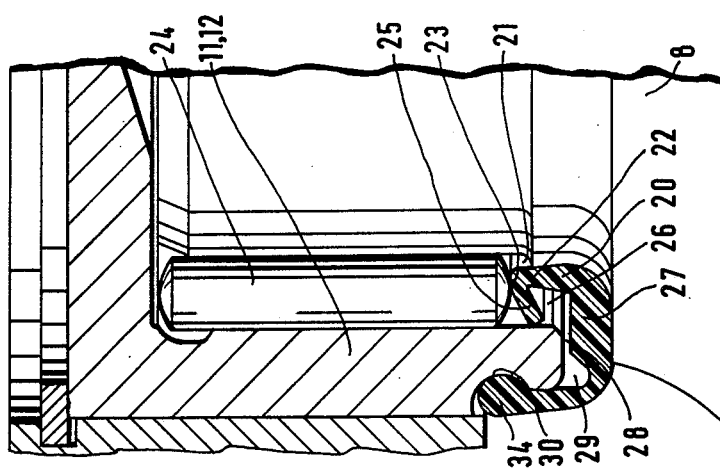
FIG. 4 is an axial sectional view in enlarged scale of a portion of a trunnion pin and surrounding bearing element and showing the seal of the present invention in section.

The sealing ring 20 which is shown in greater detail in FIG. 4 is press fitted on its trunnion pin 9, 10 so as to be rigidly mounted on the trunnion pin and thus being incapable of any movement with respect to the trunnion pin. The inner peripheral edge of the sealing ring 20 is provided with an axially extending portion 22 which projects into the interior 21 of the bearing element and is provided with an end face 23 which engages and thus supports the roller bearings 24. The axial portion 22 comprises a radially outwardly directed sealing lip 25 the outer edge of which engages the cylindrical inner surface of the bearing element 11, 12. The sealing lip 25 is sufficiently thin and resilient so as to define an annular membrane which functions as a check or non return valve to enable lubricant to pass in only one direction, namely, from the interior 21 of the bearing element toward the space 26 which is formed by the sealing lip 25 within the bearing interior 21. Thus, after any lubricant flows past the sealing lip 25 outwardly from the interior of the bearing element the sealing lip will resiliently snap back into position upon passage of the lubricant.

The sealing ring 20 is provided with a central portion 27 upon which is supported the bearing elements 11, 12. The central portion 27 is further provided with a number of ducts or grooves 28 to permit the passage of lubricant into an outer chamber 29 from which the lubricant flows past a radially outwardly directed portion 34 provided with an annular bead 30 seated within a groove formed in the outer surface of bearing elements 11, 12.

The bead 30 functions to secure the sealing ring to the bearing elements 11, 12. Any foreign matter such as water or dirt which might possibly enter into the sealing ring from the exterior of the bearing element will collect in the outer chamber 29 since such foreign matter is prevented from flowing into the interior 21 of the bearing element by the sealing lip 25.

Figure 5:
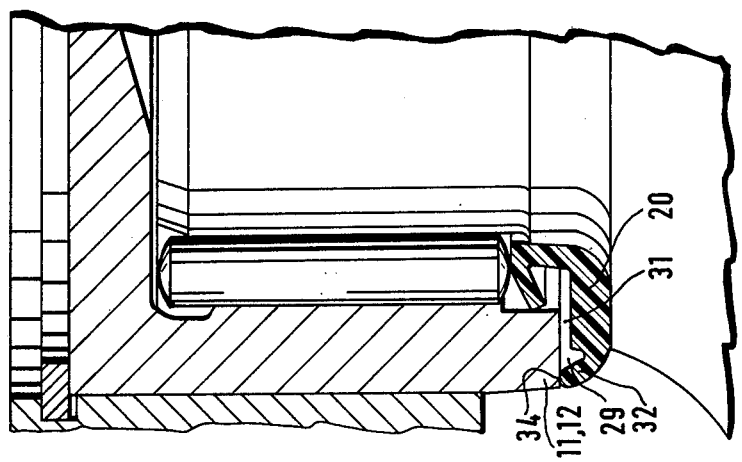
FIG. 5 is a view similar to that of FIG. 4 but showing a modification of the sealing ring.

In FIG. 5, there is shown a sealing ring 20' the outer edge of which is provided with an annular portion 32 having an end 34' which engages the end face of the bearing element 11, 12 so as to seal the bearing element with respect to the exterior. During lubrication, the annular portion 32 will resiliently open to permit any surplus lubricant to escape to the exterior of the joint and will resiliently return to its position as shown in FIG. 5 so as to prevent the entry of any foreign matter into the interior of the bearing element. Passages 31 in the central portion of the sealing ring provide communication between the outer chamber 29' and the inner chamber 26 of the sealing ring.

Figure 6:
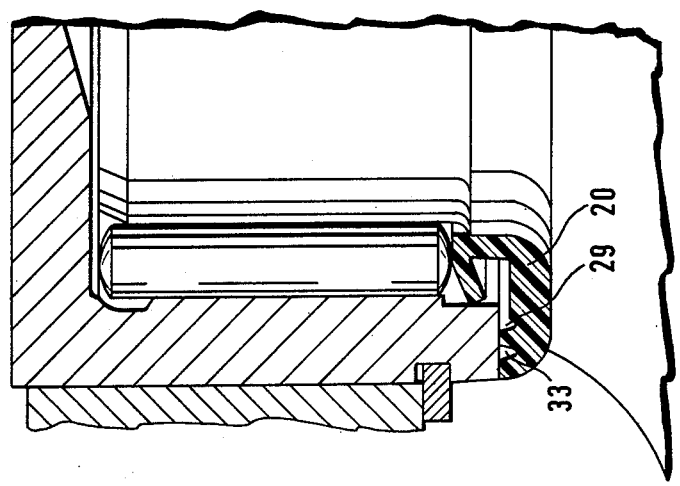
FIG. 6 is a view similar to that of FIG. 4 and showing a further modification of the sealing ring.

In FIG. 6, the sealing ring 20'' is similar to that of the sealing ring of FIG. 5 but a further outer chamber 33 is provided. The outer chamber 33 is separated from the outer chamber 29'' by means of an annular lip which also engages the end surface of the bearing element 11, 12.

The sealing ring of the present invention thus subdivides the interior of the bearing element into two relatively separate lubricant chambers. The first chamber is defined by the interior of the bearing element and the second chamber is separated from the first chamber by the sealing lip in the form of an annular membrane which functions as a check valve to allow the passage of any excess lubricant which may occur during a subsequent re-greasing of the joint.

The axial portion of the sealing ring supports the roller bearings so that the ring seal also functions as a supporting ring for the bearings and provides axial positioning of the cylindrical bearing elements.

The outer peripheral edge of the sealing ring is provided with what is essentially an extension in the axial direction which sealingly engages with the bearing element either by means of an annular bead seated in a groove or by resiliently contacting the end face of the bearing elements.

Thus it can be seen that the sealing ring of the present invention enables any excess lubricant to pass without any opposing pressure through the chambers formed by the seal to the outer edge of the seal which resiliently snaps open to permit the excess lubricant to escape but which at the same time maintains an efficient seal to keep foreign matter from penetrating to the interior of the bearing.

It will be understood that this invention is susceptible to modification in order to adapt it to different usages and conditions, and accordingly, it is desired to comprehend such modifications within this invention as may fall within the scope of appended claims.

What is claimed is:

1. In a sealing device for a universal joint, the combination of a trunnion pin having roller bearings adjacent thereto, a bearing element surrounding said trunnion pin and having an inner wall spaced from said pin, a resilient sealing ring rigidly mounted on said trunnion pin and having a first portion extending axially to project between said bearing element and said trunnion pin toward said roller bearings, said sealing ring having a second portion extending radially from said first portion and having an axially directed surface thereon engaging an end face portion of said bearing member, a sealing lip on said first portion extending substantially radially therefrom and having an outer edge movably engaging the inner wall of said bearing element, said first and second portions together with said bearing element defining a chamber, said lip defining an angle with said bearing element inner wall of less than 90° with respect to the interior of the bearing element such that the lubricant can flow outwardly from the interior of the bearing element.

2. A device as claimed in claim 1 wherein said sealing lip comprises an annular membrane.

3. A device as claimed in claim 1 and further comprising means on said ring face engaging said bearing element for defining a second chamber therewith.

4. A device as claimed in claim 3 wherein there are passages in said ring communicating said first and second chambers.

* * * * *